United States Patent
Matsushita et al.

(10) Patent No.: US 6,667,775 B2
(45) Date of Patent: Dec. 23, 2003

(54) METHOD AND DEVICE FOR CORRECTING COLOR PURITY

(75) Inventors: Tomoyoshi Matsushita, Minato-ku (JP); Shigeru Fujino, Monato-ku (JP); Jimmie D. Songer, Itasca, IL (US)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/105,449

(22) Filed: Mar. 26, 2002

(65) Prior Publication Data

US 2002/0180361 A1 Dec. 5, 2002

(30) Foreign Application Priority Data

Mar. 30, 2001 (JP) ........................................ 2001-100002

(51) Int. Cl.$^7$ ................................................ H04N 9/73
(52) U.S. Cl. ........................................ 348/655; 358/520
(58) Field of Search ........................ 348/655; 358/520; 315/368.11

(56) References Cited

U.S. PATENT DOCUMENTS 4,963,978 A * 10/1990 Ueda et al. .................. 348/655

* cited by examiner

Primary Examiner—David Vu
(74) Attorney, Agent, or Firm—Sughrue Mion, PLLC

(57) ABSTRACT

A method of correcting color purity is provided for reducing differences in picture quality between film images and television receiver images by the video signals, thus enabling reproduction of picture quality that approximates images that are shown in a movie theater. When outputting signal levels of each of the color components of video signals, color mixing is performed in which the output signal level is the sum of products of all of the color component levels that have been received as input multiplied by coefficients. By setting these coefficients within the range −0.3 to 0.3, the influence from other colors can be limited to prevent excessive change from the colors of the original image.

43 Claims, 4 Drawing Sheets

METHOD AND DEVICE FOR CORRECTING COLOR PURITY

BACKGROUND OF THE INVENTION

1. Field of the Invention

The present invention relates to a technique for converting images that have been captured on film into video signals, and in particular, to a technique for converting video signals, which have been converted using a telecine device, to approximate the color tones of a projected film.

2. Description of the Related Art

Images such as movies have up to now been taken using film, this film undergoing the processes of developing and printing and then used to project images on a screen such as in a movie theater. Movies that are shown in movie theaters are also frequently converted to images for television broadcast or video images.

When converting film images to images for television broadcast, a telecine device is used in which light-source light that is irradiated from a prescribed light source is separated into light of the primary color components RGB, the light of each primary color component is irradiated onto the film surface by way of a respective shutter and then captured by a Charge Coupled Device (CCD) camera, the pictures that are successively formed in each frame of a movie film thus being converted to video signals. The use of this telecine device can also solve discrepancies that exist between film images and video signals such as differences in frames per second.

FIG. 1 shows a representative example of the flow of the prior-art process from a developed image that has been captured on film to a broadcast image. Film that has been exposed is progressively developed in a developing process that can be divided into the steps of: camera negative, interpositive, internegative, and release print. The image of the release print is finally shown by means of projection onto a screen, such as in a movie theater. Conversion of images to video signals by a telecine device is normally carried out using film of the interpositive stage.

However, the color purity of a picture gradually deteriorates with each development and printing of film in the course of each stage of the film confirming, and an image that is shown in, for example, a theater has been processed as far as the release print stage and therefore is in a state of relatively degraded color reproducibility. Film in the interpositive stage that is read by a telecine device for converting to video signals has not been subjected to the confirming of the internegative and release print stages and therefore has better color reproducibility than the release print stage. Video signals therefore have better color reproducibility than an image that is shown by film in, for example, a movie theater. The two images differ in terms of color tone and are not equal.

Video signals that have been obtained by the above-described conversion have the characteristic of superior color reproducibility and have a picture quality that differs from an image that is projected from film and shown in, for example, a movie theater.

In recent years, the increase in the size of screens of television sets for home use, the steadily dropping price of plasma displays and liquid crystal projectors, and the increasing number of movies that are broadcast by satellite broadcast or cable TV have all contributed to a growing demand for a movie-viewing experience in the home that approaches the ambience of a movie theater. As described hereinabove, however, video signals that are received in the home have a different picture quality than images shown in, for example, a movie theater, and it has not been possible to reproduce images that are equivalent to images shown in a movie theater.

SUMMARY OF THE INVENTION

It is an object of the present invention to provide a method of correcting color purity that can reduce the difference in picture quality that exists between film images and video signals in the prior art and that can reproduce picture quality that approaches that of images shown in a movie theater.

The method of correcting color purity of the present invention for solving the above-described problems is a method of correcting the level of each color component of video signals that have been received as input and outputting the result, wherein the output level of one color component is determined based on and in combination with the input levels of all of the color components.

Because the output level of one color component is determined based on the level of all color components, the color purity falls, and video signals can be outputted that have picture quality that approaches that of film images of the release print stage.

In addition, the method of correcting color purity of the present invention for resolving the above-described problems establishes the relation:

$$\begin{bmatrix} Ero \\ Ego \\ Ebo \end{bmatrix} = \begin{bmatrix} x1 & y1 & z1 \\ x2 & y2 & z2 \\ x3 & y3 & z3 \end{bmatrix} \begin{bmatrix} Eri \\ Egi \\ Ebi \end{bmatrix}$$

where the received video signals are RGB signals; the levels of each color components that have been received as input are Eri, Egi, and Ebi; and the levels of each of the color components that are outputted are Ero, Ego, and Ebo.

The relation between the input signals and the output signals is represented as a determinant, and the correction of each color component can thus be facilitated.

Further, the method of correcting color purity of the present invention for solving the above-described problems stipulates that the value of at least one of y1, z1, x2, z2, x3, and y3 in the determinant shown above is not 0.

The stipulation that the value of at least one of the non-diagonal components in the matrix shown above is not zero means that the output color signals are influenced by other color components of the input color signals and enables a drop in color purity when the colors are mixed.

In addition, in the method of correcting color purity of the present invention for solving the above-described problems, the values of y1, z1, x2, z2, x3, and y3 are stipulated within a range from −0.30 to 0.30.

The stipulation that the values of the non-diagonal components of the matrix are within the range from −0.30 to 0.30 limits the influence from other color component upon an output color component and thus can prevent a drastic change in picture quality.

Further, in the method of correcting color purity of the present invention for solving the above-described problems, the comparison of the levels Eri, Egi, and Ebi of each of the color components that are received as input is performed by detecting differences between signals; such that y1 and x2 are set to 0 when Eni and Egi are equal, z1 and x3 are set to 0 when En and Ebi are equal, and z2 and y3 are set to 0 when Egi and Ebi are equal.

When the signal levels of each RGB color component of input signals are equal, the input color signal and the display output are achromatic white, black, or gray and color mixing is preferably not performed. Thus, when differences between signals are detected for the purpose of comparing the signal levels of each of the color components and signal levels are found to be equal, gray-scales can be outputted without mixing colors.

Further, in the method of correcting color purity of the present invention for solving the above-described problems, the video signals are obtained by using a telecine device to convert film images of the interpositive stage to telecine images.

Mixing each color component of telecine images to correct color purity enables a reduction of the excess color clarity of film images of the interpositive stage and thus enables an image to be obtained that is equivalent to an image that is experienced in a movie theater.

Further, the method of correcting color purity of the present invention for solving the above-described problems is applied for correction of color purity only when the video signal are telecine image which is detected by telecine image detection device.

In this way, correction of color purity is performed selectively only for telecine images and color correction is not performed for other images, whereby only the excess color clarity of film images of the interpositive stage is reduced and the reduction of the color purity in non-telecine images can be avoided.

In addition, the image display device of the present invention for solving the above-described problems has a means for effecting each of the above-described corrections.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Embodiments of the present invention are next described with reference to the accompanying drawings. The embodiments described hereinafter are representative and do not limit the scope of the present invention.

First Embodiment

Figure 1:
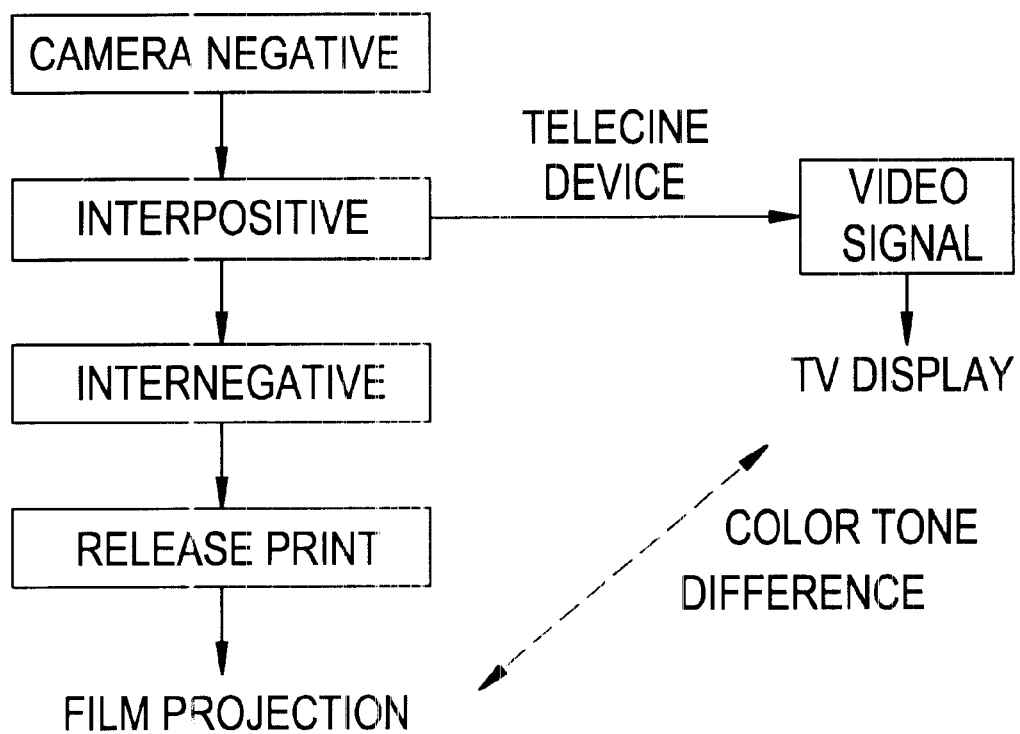
FIG. 1 is a flow chart of video signal conversion of the prior art.
Figure 2:
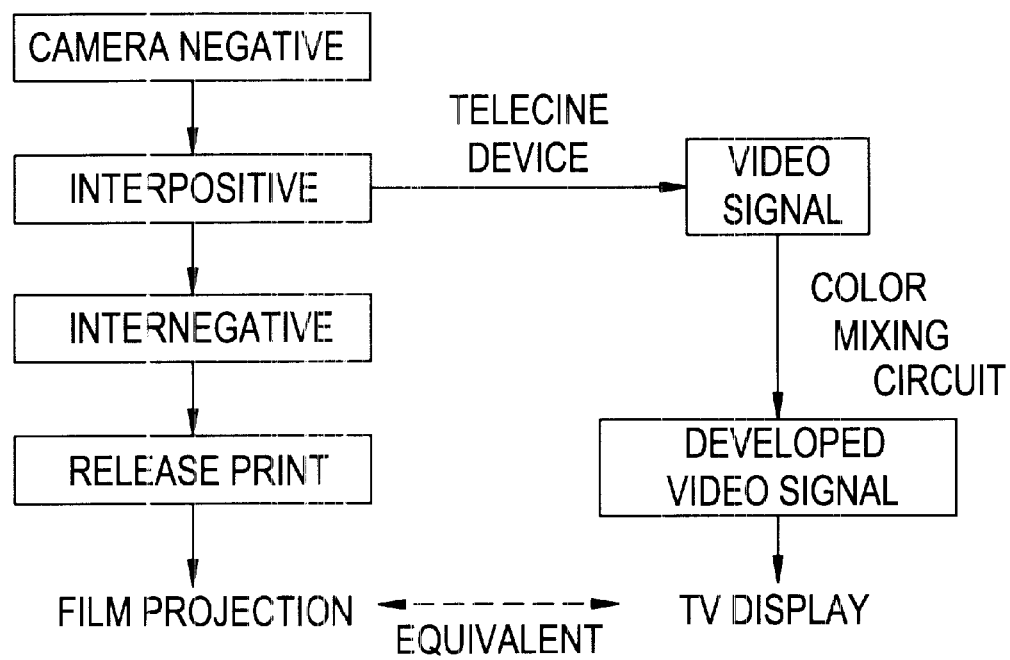
FIG. 2 is a flow chart of video signal conversion in which color purity is corrected.

The color purity of an image gradually deteriorates with each step of the film development process. The color at a particular point of an image is mixed with surrounding colors with each stage of film confirming. Thus, if a film image of the interpositive stage is converted to video signals by a telecine device and the colors of the resulting video signal then subjected to color mixing is applied as equivalent to undergoing the processes of the internegative stage and release print stage as shown in the flow chart of FIG. 2, the images that are displayed on, for example, a television can approximate the images that are shown in a movie theater.

Eri, Egi, and Ebi represent each of the components of RGB signals, which are video signals that have been obtained by conversion by a telecine device; and outputs Ero, Ego, and Ebo are obtained when Eri, Egi, and Ebi are applied as input to a prescribed circuit. If it is here assumed that each of the input components are mixed to obtain output, the relation between the input and output can be represented by the following determinant:

$$\begin{bmatrix} Ero \\ Ego \\ Ebo \end{bmatrix} = \begin{bmatrix} x1 & y1 & z1 \\ x2 & y2 & z2 \\ x3 & y3 & z3 \end{bmatrix} \begin{bmatrix} Eri \\ Egi \\ Ebi \end{bmatrix} \quad \text{Equation 1}$$

When $x1=y2=z3=1$ and $y1=z1=x2=z2=x3=y3=0$, the RGB signals are not mixed and the input signals and output signals are the same state.

Figure 3:
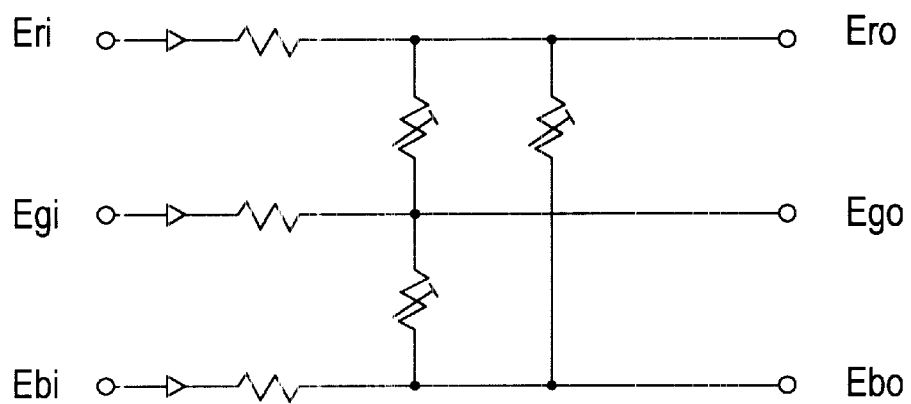
FIG. 3 shows a color purity correction circuit according to the first embodiment.

FIG. 3 shows a color purity correction circuit for performing color mixing. As shown in FIG. 3, the signal lines that electrically connect the input signal terminal and output signal terminal for each color component are in turn electrically interconnected by variable resistors varying the set value of each variable resistor has the same effect as the matrix that is shown in Equation 1, whereby each of the input signal components Eri, Egi, and Ebi are mixed to obtain output signal components Ero, Ego, and Ebo.

When mixing each of the color components, excessive influence from other color signals is not desirable. When influence from other color signals is excessive, the change in color tone from the image of the interpositive stage becomes excessive, resulting in color expression that widely diverges from the color tones of the original picture.

Figure 4:
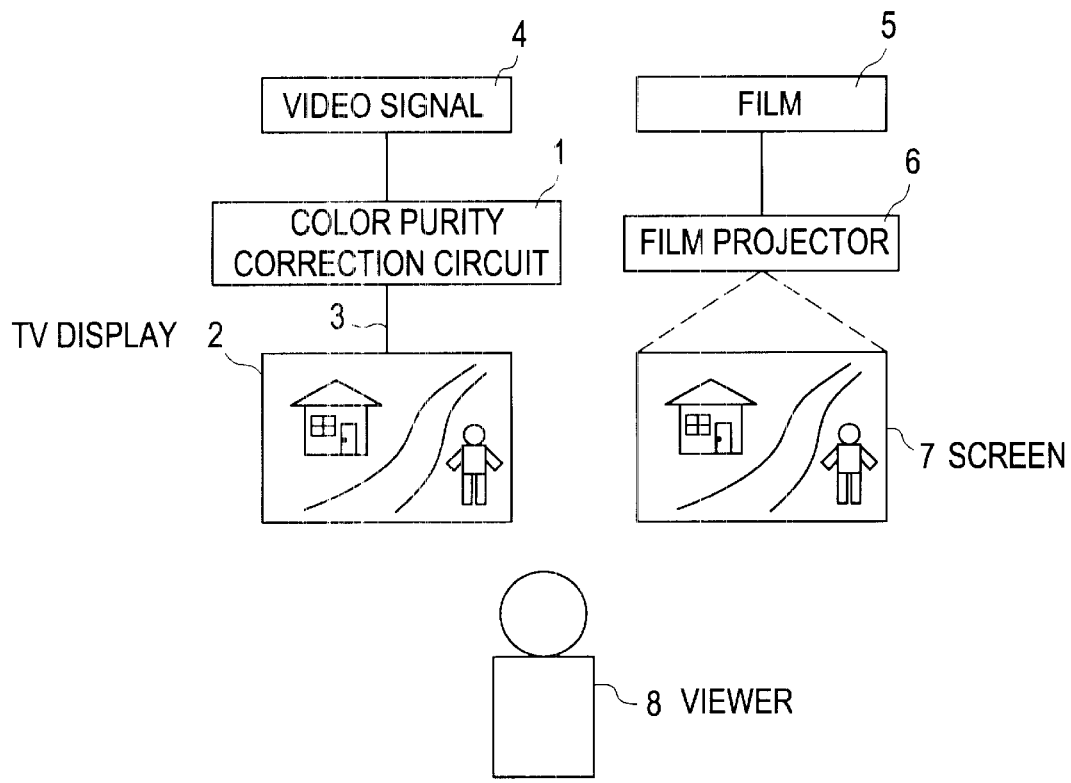
FIG. 4 is a schematic view of a subjective evaluation method of color purity correction.

Subjective evaluation was carried out as shown in FIG. 4 to find the appropriate range of color component mixing. Color purity correction circuit 1 shown in FIG. 3 was connected to RGB signal line 3 of television set 2 or a projector, video signal 4 composed-of signal components Eri, Egi and Ebi that were obtained by subjecting film of the interpositive stage to telecine conversion was applied as input, and the signal was displayed on television set 2 or a projector. Meanwhile, film 5 of the release print stage was projected onto screen 7 by projector 6 in close proximity to television set 2. Viewer 8 then viewed the changes in color tone as the degree of color mixing was adjusted by varying the variable resistance values of color purity correction circuit 1 while simultaneously displaying the same scene of the same image source on television set 2 and screen 7.

The subjective evaluation shown in FIG. 4 was carried out, and the results obtained indicated that the influence from mixing of other colors is preferably 30% or less. In other words, each component in the matrix of Equation 1 is preferably within the range: $-0.30 \leq y1, z1, x2, z2, x3, y3 = \leq 0.30$. Here, at least one of y1, z1, x2, z2, x3, and y3 should not be 0.

Second Embodiment

Figure 5:
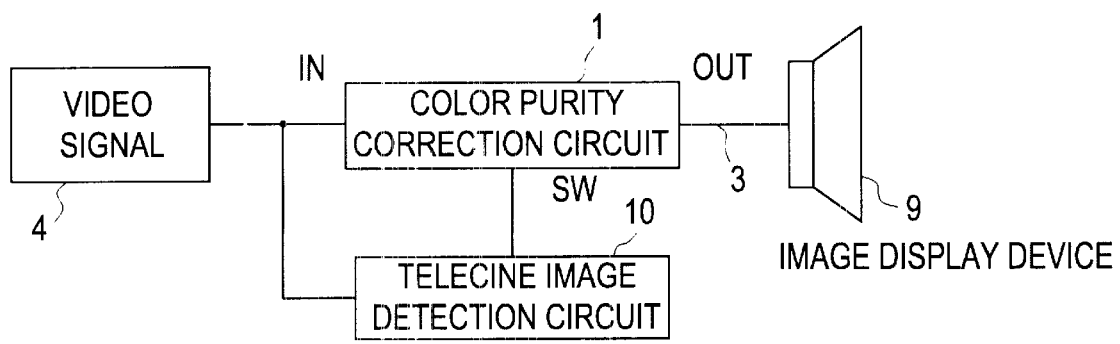
FIG. 5 is a schematic view of an image display device of the second embodiment.

FIG. 5 illustrates an actual method of using the color purity correction circuit. Color purity correction circuit 1 is connected to RGB signal line 3 of image display device 9, which is, for example, a television set or a projector. Video signal 4 is applied as input from the IN side, color mixing is carried out, the result is outputted from the OUT side of color purity correction circuit 1, and an image is displayed on image display device 9. Telecine image detection circuit 10 is connected to the IN side of color purity correction circuit 1, and telecine image detection circuit 10 turns ON switch SW of color purity correction circuit 1 upon determining that video signal 4 is a telecine image. Switch SW may also be turned ON and OFF manually.

The construction of telecine image detection circuit 10 is disclosed in, for example, Japanese Patent Laid-open No. 28735/01, and thus can be realized by using a known circuit. When telecine image detection circuit 10 determines that video signal 4 is a telecine image, switch SW of color purity correction circuit 1 is turned ON and each of the color signals are mixed. When video signal 4 is determined not to be a telecine image, switch SW of color purity correction circuit 1 is turned OFF and mixing of each of the color signals is not carried out. Accordingly, the adoption of the configuration shown in FIG. 5 enables the automatic determination of telecine images and switching of switch SW. When images such as television broadcasts and video images are images that have been converted by a telecine device, images having picture quality that approaches that of images shown in a movie theater can be displayed automatically.

Third Embodiment

Figure 6:
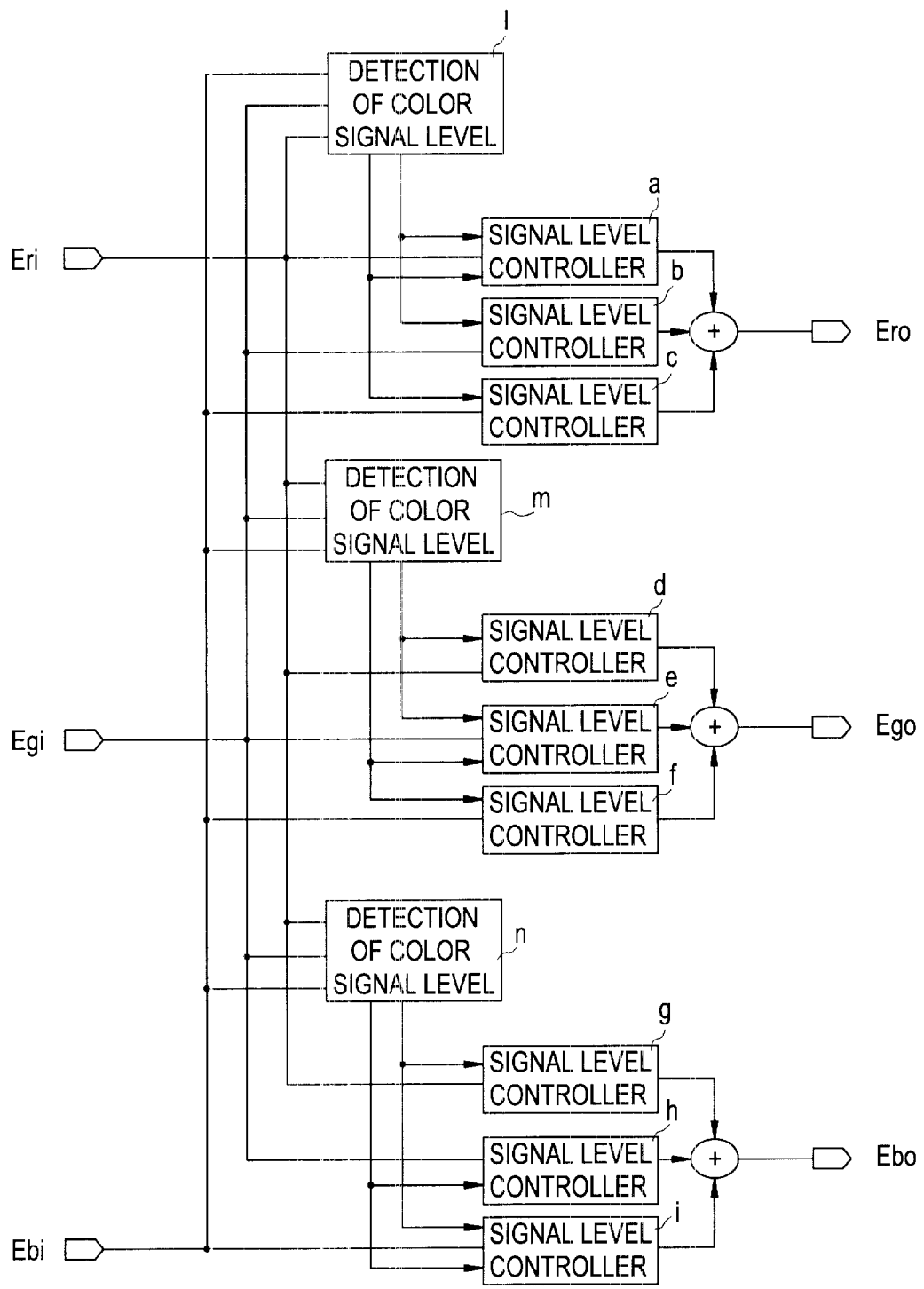
FIG. 6 is a block diagram showing a color purity correction circuit in the third embodiment.

Regarding another embodiment of the present invention, FIG. 6 is a block diagram showing another embodiment of the color purity correction circuit that is shown in FIG. 3 in the previously described embodiment, this being a color purity correction circuit for a case in which the video signals are digital signals.

When the signal levels of each of the RGB color components are equal, the displayed color is a gray that contains white and black. When such signals are applied as input, the output preferably has no color regardless of the case. To realize this result, the signal level of each color component is detected by a signal difference detector and compared, and the signal level control is then performed based on the comparison results.

Differences between each of the color signal components Eri, Egi, and Ebi are detected by means of signal difference detectors 1–n, and color mixing of each of the color components is carried out by signal level controllers a–i to obtain output signals Ero, Ego, and Ebo. Modification of the control of signal level controllers a–i modifies each element of the matrix of Equation 1. As in the first and second embodiments, each of the components of the matrix of Equation 1 is preferably within the range of 10.30 y1, z1, x2, z2, x3, y3 0.30, and at least one of y1, z1, x2, z2, x3, and y3 should not be 0.

Regarding each of the components of the matrix of Equation 1, when, of the levels Eri, Egi, and Ebi of each of the color components that are applied as input, Eri and Egi are equal, y1 and x2 are set to 0. Similarly, z1 and x3 are set to 0 when Eri and Ebi are equal, and z2 and y3 are set to 0 when Egi and Ebi are equal. In this way, when an achromatic color is applied as input, the attribution of color can be eliminated and the display output can also be made an achromatic color.

As described above, the output level of one color component is determined based on the levels of all of the color components, so that the color purity drops and video signals can be outputted having picture quality that approaches that of film images of the release print stage.

The use of a determinant to represent the relation between input signals and output signals can facilitate the correction of each color component.

The stipulation that at least one value of the non-diagonal components of the matrix is not 0 means that color signals that are outputted are influenced by other color components of the color signals that have been inputted, and color mixing therefore can reduce color purity.

Limiting the value of non-diagonal components of the matrix to the range of 10.30 to 0.30 limits the influence of other color components upon a color component that is outputted and can prevent a drastic change in picture quality.

Mixing each of the color components of telecine images to correct color purity reduces the excessive color clarity of film images of the interpositive stage and allows images to be obtained equivalent to images enjoyed in a movie theater.

Selectively correcting the color purity of only telecine images and not color correcting other images enables reduction of only excessive color clarity of film images of the interpositive stage and can avoid reduction of color purity in non-telecine images.

The display of images that is realized by means of the method of correcting color purity that is described in claims allows images on a home image display device to be enjoyed with the same ambience as a movie theater.

While preferred embodiments of the present invention have been described using specific terms, such description is for illustrative purposes only, and it is to be understood that changes and variations may be made without departing from the spirit or scope of the following claims.

What is claimed is:

1. A method of correcting color purity including correcting the level of each color component of video signals that have been applied as input and outputting the result, said method including a step of determining an output level of one color component based on the input levels of all of the color components.

2. A method of correcting color purity according to claim 1, wherein said video signals that have been received as input are RGB signals, and including representing the output levels of each of the color components by the determinant:

$$\begin{bmatrix} Ero \\ Ego \\ Ebo \end{bmatrix} = \begin{bmatrix} x1 & y1 & z1 \\ x2 & y2 & z2 \\ x3 & y3 & z3 \end{bmatrix} \begin{bmatrix} Eri \\ Egi \\ Ebi \end{bmatrix}$$

where Eri, Egi, and Ebi are the levels of each of the color components that have been received as input; and Ero, Ego, and Ebo are the levels of each of the color components that are outputted.

3. A method of correcting color purity according to claim 2, including making the value of at least one of y1, z1, x2, z2, x3, and y3 other than 0.

4. A method of correcting color purity according to claim 2, including making the values of y1, z1, x2, z2, x3 and y3 are within the range from −0.30 to 0.30.

5. A method of correcting color purity according to claim 3, including making the values of y1, z1, x2, z2, x3 and y3 are within the range from −0.30 to 0.30.

6. A method of correcting color purity according to claim 2, including comparing the levels Eri, Egi, and Ebi of each color component that have been received as input by detecting differences between signals; and setting y1 and x2 to 0 when Eri and Egi are equal;

setting z1 and x3 to 0 when Eri and Ebi are equal; and, setting z2 and y3 to 0 when Egi and Ebi are equal.

7. A method of correcting color purity according to claim 3, including comparing the levels Eri, Egi, and Ebi of each color component that have been received as input is performed by detecting differences between signals; and setting y1 and x2 to 0 when Eri and Egi are equal;
setting z1 and x3 to 0 when Eri and Ebi are equal; and,
setting z2 and y3 to 0 when Egi and Ebi are equal.

8. A method of correcting color purity according to claim 4, including comparing the levels Eri, Egi, and Ebi of each color component that have been received as input is performed by detecting differences between signals; and setting y1 and x2 to 0 when Eri and Egi are equal;
setting z1 and x3 to 0 when Eri and Ebi are equal; and,
setting z2 and y3 to 0 when Egi and Ebi are equal.

9. A method of correcting color purity according to claim 5, including comparing the levels Eri, Egi, and Ebi of each color component that have been received as input is performed by detecting differences between signals; and setting y1 and x2 to 0 when Eri and Egi are equal;
setting z1 and x3 to 0 when Eri and Ebi are equal; and,
setting z2 and y3 to 0 when Egi and Ebi are equal.

10. A method of correcting color purity according to claim 1, including taking said video signals as telecine images that have been converted by means of a telecine device to convert film images of the interpositive stages.

11. A method of correcting color purity according to claim 2, including taking said video signals as telecine images that have been converted by means of a telecine device to convert film images of the interpositive stages.

12. A method of correcting color purity according to claim 3, including taking said video signals as telecine images that have been converted by means of a telecine device to convert film images of the interpositive stages.

13. A method of correcting color purity according to claim 4, including taking said video signals as telecine images that have been converted by means of a telecine device to convert film images of the interpositive stages.

14. A method of correcting color purity according to claim 5, including taking said video signals is telecine images that have been converted by means of a telecine device to convert film images of the interpositive stages.

15. A method of correcting color purity according to claim 6, including taking said video signals as telecine images that have been converted by means of a telecine device to convert film images of the interpositive stages.

16. A method of correcting color purity according to claim 1, including using a telecine image detection device to detect whether said video signals are telecine images that have been converted by means of a telecine device, and correcting color purity only when said video signals are said telecine images.

17. A method of correcting color purity according to claim 2, including using a telecine image detection device to detect whether said video signals are telecine images that have been converted by means of a telecine device, and correcting color purity only when said video signals are said telecine images.

18. A method of correcting color purity according to claim 3, including using a telecine image detection device to detect whether said video signals are telecine images that have been converted by means of a telecine device, and correcting color purity only when said video signals are said telecine images.

19. A method of correcting color purity according to claim 4, including using a telecine image detection device to detect whether said video signals are telecine images that have been converted by means of a telecine device, and correcting color purity only when said video signals are said telecine images.

20. A method of correcting color purity according to claim 5, including using a telecine image detection device to detect whether said video signals are telecine images that have been converted by means of a telecine device, and correcting color purity only when said video signals are said telecine images.

21. A method of correcting color purity according to claim 6, including using a telecine image detection device to detect whether said video signals are telecine images that have been converted by means of a telecine device, and correcting color purity only when said video signals are said telecine images.

22. A method of correcting color purity according to claim 10, including using a telecine image detection device to detect whether said video signals are telecine images that have been converted by means of a telecine device, and correcting color purity only when said video signals are said telecine images.

23. A color purity correction device for correcting the level of each color component of video signals that have been received as input and outputting the result; said device comprising a means for determining the output level of one color component based on and in combination with the input levels of all of the color components.

24. A color purity correction device according to claim 23, said device comprising means that represents the output levels of each of the color components by the determinant:

$$\begin{bmatrix} Ero \\ Ego \\ Ebo \end{bmatrix} = \begin{bmatrix} x1 & y1 & z1 \\ x2 & y2 & z2 \\ x3 & y3 & z3 \end{bmatrix} \begin{bmatrix} Eri \\ Egi \\ Ebi \end{bmatrix}$$

wherein said video signals that have been received as input are RGB signals; Eri, Egi, and Ebi are the levels of each of the color components that have been received as input; and Ero, Ego, and Ebo are the levels of each of the color components that are outputted.

25. A color purity correction device according to claim 24, said device comprising means for making the value of at least one of y1, z1, x2, z2, x3, and y3 a value other than 0.

26. A color purity correction device according to claim 24, said device comprising means for making the values of y1, z1, x2, z2, x3 and y3 within the range from −0.30 to 0.30.

27. A color purity correction device according to claim 25, said device comprising means for making the values of y1, z1, x2, z2, x3 and y3 within the range from −0.30 to 0.30.

28. A color purity correction device according to claim 24, said device comprising means for comparing the levels Eri, Egi, and Ebi of each of the color component that have been received as input by detecting differences between signals, and for:

setting y1 and x2 to 0 when Eri and Egi are equal;
setting z1 and x3 to 0 when En and Ebi are equal; and,
setting z2 and y3 to 0 when Egi and Ebi are equal.

29. A color purity correction device according to claim 25, said device comprising means for comparing the levels Eri, Egi, and Ebi of each of the color component that have been received as input by detecting differences between signals, and for:

setting y1 and x2 to 0 when Eri and Egi are equal;
setting z1 and x3 to 0 when Eri and Ebi are equal; and,
setting z2 and y3 to 0 when Egi and Ebi are equal.

30. A color purity correction device according to claim 26, said device comprising means for comparing the levels Eri, Egi, and Ebi of each of the color component that have been received as input by detecting differences between signals, and for:

setting y1 and x2 to 0 when Eri and Egi are equal;

setting z1 and x3 to 0 when Eri and Ebi are equal; and, setting z2 and y3 to 0 when Egi and Ebi are equal.

31. A color purity correction device according to claim 27, said device comprising means for comparing the levels Eri, Egi, and Ebi of each of the color component that have been received as input by detecting differences between signals, and for:

setting y1 and x2 to 0 when Eri and Egi are equal;

setting z1 and x3 to 0 when Eri and Ebi are equal; and, setting z2 and y3 to 0 when Egi and Ebi are equal.

32. A color purity correction device according to claim 23, said device comprising means for taking said video signals as telecine images that have been obtained by using a telecine device to convert film images of the interpositive stages.

33. A color purity correction device according to claim 24, said device comprising means for taking said video signals as telecine images that have been obtained by using a telecine device to convert film images of the interpositive stages.

34. A color purity correction device according to claim 25, said device comprising means for taking said video signals as telecine images that have been obtained by using a telecine device to convert film images of the interpositive stages.

35. A color purity correction device according to claim 27, said device comprising means for taking said video signals as telecine images that have been obtained by using a telecine device to convert film images of the interpositive satages.

36. A color purity correction device according to claim 27, said device comprising means for taking said video signals as telecine images that have been obtained by using a telecine device to convert film images of the interpositive stages.

37. A color purity correction device according to claim 28, said device comprising means for taking said video signals as telecine images that have been obtained by using a telecine device to convert film images of the interpositive stages.

38. A color purity correction device according to claim 24, wherein a telecine image detection device is used to detect whether said video signals are telecine images that have been converted by means of a telecine device, and said color purity correcting device comprises means for correcting color purity only when said video signals are said telecine images.

39. A color purity correction device according to claim 25, wherein a telecine image detection device is used to detect whether said video signals are telecine images that have been converted by means of a telecine device, and said color purity correcting device comprises means for correcting color purity only when said video signals are said telecine images.

40. A color purity correction device according to claim 26, wherein a telecine image detection device is used to detect whether said video signals are telecine images that have been converted by means of a telecine device, and said color purity correcting device comprises means for correcting color purity only when said video signals are said telecine images.

41. A color purity correction device according to claim 27, wherein a telecine image detection is used to detect whether said video signals are telecine images that have been converted by means of a telecine device, and said color purity correcting device comprises means for correcting color purity only when said video signals are said telecine images.

42. A color purity correction device according to claim 28, wherein a telecine image detection device is used to detect whether said video signals are telecine images that have been converted by means of a telecine device, and said color purity correcting device comprises means for correcting color purity only when said video signals are said telecine images.

43. A color purity correction device according to claim 32, wherein a telecine image detection device is used to detect whether said video signals are telecine images that have been converted by means of a telecine device, and said color purity correcting device comprises means for correcting color purity only when said video signals are said telecine images.

* * * * *

UNITED STATES PATENT AND TRADEMARK OFFICE
CERTIFICATE OF CORRECTION

PATENT NO. : 6,667,775 B2
DATED : December 23, 2003
INVENTOR(S) : Tomoyoshi Matsushita, Shigeru Fujino and Jimmie D. Songer It is certified that error appears in the above-identified patent and that said Letters Patent is hereby corrected as shown below:

Column 2,
Line 65, delete "Eni" and insert -- Eri --;
Line 66, delete "En" and insert -- Eri --;

Column 6,
Lines 43 and 62, delete "En" and insert -- Eri --;

Column 8,
Line 52, delete "En" and insert -- Eri --;

Column 9,
Line 1, delete "En" and insert -- Eri --.

Signed and Sealed this

Twenty-eighth Day of December, 2004

JON W. DUDAS
*Director of the United States Patent and Trademark Office*